United States Patent [19]

Kagota et al.

[11] Patent Number: 5,252,393

[45] Date of Patent: Oct. 12, 1993

[54] THERMAL DELAYED-TACK ADHESIVE COMPOSITIONS AND THERMAL DELAYED-TACK ADHESIVE SHEETS

[75] Inventors: Nobuhiro Kagota, Takasago; Hirokazu Tsukahara, Tokyo, both of Japan

[73] Assignee: Mitsubishi Paper Mills Ltd., Tokyo, Japan

[21] Appl. No.: 879,123

[22] Filed: May 5, 1992

Related U.S. Application Data

[63] Continuation of Ser. No. 207,581, Jun. 16, 1988, abandoned.

[30] Foreign Application Priority Data

Jun. 25, 1987 [JP] Japan .................. 62-159144

[51] Int. Cl.$^5$ .................................. C09J 7/02
[52] U.S. Cl. .......................... 428/349; 428/355; 524/271; 524/272; 524/522
[58] Field of Search ............... 428/355, 347, 349, 323; 524/271, 272, 522

[56] References Cited

U.S. PATENT DOCUMENTS 4,645,783  2/1987  Kinoshita ..................... 524/522
4,745,026  5/1988  Tsukahara et al. .............. 428/349

FOREIGN PATENT DOCUMENTS 0021456  2/1980  Japan .

OTHER PUBLICATIONS

"Carboxylic Polymers in Hot-Melt Adhesives"; Handbook of Adhesives; Skeist; Van Nostrand and Reinhold; 1977; pp. 331-341 and 495-505.

*Primary Examiner*—Jenna L. Davis
*Attorney, Agent, or Firm*—Schwartz & Weinrieb

[57] ABSTRACT

The present invention is concerned with a thermal delayed tack composition which is non-adhesive at ordinary temperatures but can be activated and tackified when heated and can maintain its tackiness for a long period of time even after separated from a heat source, and thermal delayed tack sheets prepared by coating basic sheets with this thermal delayed tack composition and then drying the same. The thermal delayed tack sheets have the features that even when they are wound into a roll or superimposed upon each other, no blocking or sticking occurs, and that the tackiness thereof can be maintained for a long period of time even upon a plastic material such as for example polyethylene having low polarity. The aforesaid thermal delayed tack composition comprises an aqueous resin dispersion containing, as fundamental components, solid components of (a) 100 parts by weight of a polymer resin containing 1% by weight or more of carboxylic acid-modified polyethylene, (b) 10 to 120 parts by weight of a tackifier, and (c) 50 to 300 parts by weight of a solid plasticizer. Furthermore, the aforesaid thermal delayed tack sheets may be prepared by aqueously coating the basic sheets with the above-mentioned composition and then drying the same.

20 Claims, No Drawings

THERMAL DELAYED-TACK ADHESIVE COMPOSITIONS AND THERMAL DELAYED-TACK ADHESIVE SHEETS

This application is a continuation of application Ser. No. 207,581, filed Jun. 16, 1988, now abandoned.

BACKGROUND OF THE INVENTION (1) Field of the Invention

The present invention relates to thermal delayed-tack adhesive compositions which are non-adhesive at ordinary temperatures but which can be activated and tackified when heated, and which still further can maintain its tackiness for a long period of time even after being separated from a heat source, and it also relates to thermal delayed-tack adhesive sheets which are prepared by means of coating sheet materials with said thermal delayed-tack adhesive compositions and then drying the same.

(2) Description of the Prior Art

Thermal delayed-tack adhesive sheets are also called heat sensitive delayed adhesive sheets and are described in, for example, "Adhesion Handbook", 12th edition, Kobunshi Kanko-kai, 1980. Fundamentally, each of the thermal delayed-tack adhesive sheets has a coating layer which comprises a thermal delayed-tack adhesive composition containing (a) a polymeric resin such as, for example, polyvinyl acetate, polybutyl methacrylate, vinyl chloride-vinylidene chloride copolymer, a synthetic rubber, vinyl acetate-2-ethylhexyl acrylate copolymer, vinyl acetate-ethylene copolymer, vinylpyrrolidone-styrene copolymer, styrene-butadiene copolymer or vinylpyrrolidone-ethyl acrylate copolymer, (b) a plasticizer, which is in a solid state at ordinary temperatures, such as, for example, diphenyl phthalate, dihexyl phthalate, dicyclohexyl phthalate, dihydroabietyl phthalate, dimethyl isophthalate, sucrose benzoate, ethylene glycol dibenzoate, trimethylolethane tribenzoate, glyceride tribenzoate, pentaerythritol tetrabenzoate, sucrose octaacetate, tricyclohexyl citrate or N-cyclohexyl-p-toluenesulfonamide, and (c) a tackifier such as, for example, a rosin derivative (rosin, polymerized rosin, hydrogenated rosin, its ester with glycerin, pentaerythritol or the like, resin acid dimer, or the like), terpene resin, petroleum resin, phenolic resin or xylene resin. The above-mentioned polymer material is the basis of the tack strength and adhesive force, and the tackifier is the component for increasing the tackiness when the polymer material is activated by means of the heating process. The solid plasticizer is in the state of a solid at ordinary temperatures and does not provide any plasticity to the polymer material at such a temperature level, but when heated, the plasticizer is melted, so that the polymer material is expanded and dissolved in order to exhibit the tackiness. After being melted, the plasticizer crystallizes slowly, and therefore even after the thermal activation, the tacky state can remain upon the tack sheet for a long period of time. In addition, morphological examples of a known coating liquid for the manufacture of the thermal delayed tack sheets include a hot melt type liquid for example, Japanese Patent Unexamined Publication Nos. 55-16055 and 56-106984), an organic solvent type liquid for example, Japanese Patent Unexamined Publication No. 51-111246) and an aqueous type liquid (Souichi Muroi, "Polymer Latex Adhesive", Kobunshi Kanko-kai).

In the case that the composition prepared by means of blending the polymer resin, the tackifier and the solid plasticizer is of the hot melt type or organic solvent type (coating liquid), the solid plasticizer is melted by means of heating or by being disposed within an organic solvent. Therefore, the composition with which the sheet has just been coated is active and is in a tacky state. In order to render the composition nonactive, it is necessary to wait for the recrystallization of the solid plasticizer, and hence a process is required in which the coated sheets are allowed to stand for a very long period of time. In addition, when wound into a roll or superimposed upon each other, the coated sheets are liable to stick to each other. Therefore, the composition of such a type must be applied to specific basic sheets previously coated upon the other side thereof with a suitable releasing agent.

Moreover, conventional thermal delayed tack sheets tend to prematurely peel from articles upon which they have been stuck, particularly in the case wherein the articles are made from a plastic material such as, for example, polyethylene having low polarity. In consequence, it is fair to say that the conventional sheets have poor practical value.

SUMMARY OF THE INVENTION

The present invention is directed toward a thermal delayed tack composition which comprises an aqueous resin dispersion containing, as fundamental components, solid components of (a) 100 parts by weight of a polymer resin containing 1% by weight or more of carboxylic acid-modified polyethylene, (b) 10 to 120 parts by weight of a tackifier, and (c) 50 to 300 parts by weight of a solid plasticizer. In addition, the present invention is also directed toward thermal delayed tack sheets prepared by aqueously coating basic sheets with the above-mentioned thermal delayed tack composition and then drying the same.

OBJECTS OF THE INVENTION

A first object of the present invention is to manufacture, by coating conventional papers, thermal delayed tack sheets in which no blocking or sticking occurs even if they are immediately wound upon themselves after being dried for only a short period of time.

A second object of the present invention is to provide thermal delayed tack sheets which can retain their tackiness for a sufficient amount of time even upon a plastic material having low polarity.

A third object of the present invention is to provide a coating liquid composition which permits manufacturing such thermal delayed tack sheets.

DETAILED DESCRIPTION OF THE PREFERRED EMBODIMENTS

The inventors of the present application attempted to prepare a coating composition in the form of an aqueous dispersion so that a solid plasticizer could be used for maintaining the same in a solid state. As a result, thermal delayed sheets can be readily manufactured in which no blocking or sticking occurs even when wound into a roll, by selecting such drying conditions so as not to thermally activate the tack sheets.

This great advantage is obtained by first preparing a coating material in the form of an aqueous dispersion and then coating the sheets with the thus prepared aqueous dispersion. On the other hand, if an aqueous dispersion of such a known polymer material as mentioned above is used to prepare the thermal delayed tack sheets and if the prepared tack sheets are stuck upon a plastic material such as, for example, polypropylene or polyethylene having low polarity, the tackiness or adhesion cannot be maintained for a sufficiently long period of time. Tests with respect to tackiness were made concerning a wide variety of other polymers, and it has been finally determined that when carboxylic acid-modified polyethylene is employed as at least a part of the polymer material, thermal delayed tack sheets are able to be obtained in which sufficient tackiness or adhesion can be maintained for a long period of time, and the above-mentioned objects can be accomplished by means of this process. The thermal delayed tack sheets prepared by means of the aqueous coating process utilizing such a carboxylic acid-modified polyethylene were not previously known.

More particularly, the first aspect of the present invention embodies a thermal delayed tack composition which comprises an aqueous resin dispersion containing, as fundamental components, solid components of (a) 100 parts by weight of a polymer resin containing 1% by weight or more of carboxylic acid-modified polyethylene, (b) 10 to 120 parts by weight of a tackifier, and (c) 50 to 300 parts by weight of a solid plasticizer.

The second aspect of the present invention embodies thermal delayed tack sheets prepared by aqueously coating basic sheets with the above-mentioned thermal delayed tack composition, followed by drying.

In the accordance with the present invention, the polymer resin of component (a) contains at least 1% by weight, preferably 1 to 50% by weight, of carboxylic acid-modified polyethylene, and examples of other resins which can be used as component (a) include the above-mentioned polyvinyl acetate, polybutyl methacrylate, vinyl chloride-vinylidene chloride copolymer, synthetic rubbers, vinyl acetate-2-ethylhexyl acrylate copolymer, vinyl acetate-ethylene copolymer, vinylpyrrolidone-styrene copolymer, styrene-butadiene copolymer, vinylpyrrolidone-ethyl acrylate copolymer and metallic salts (Na, Zn, K and the like) of styrene-maleic anhydride copolymer. Of these resins, ones having melting points of 130° C. or less are preferably used.

Suitable examples of the carboxylic acid-modified polyethylenes include ethylene-unsaturated carboxylic acid copolymers such as ethylene-acrylic acid copolymer mainly comprising ethylene and ethylene-methacrylic acid copolymer, and in the present invention, the carboxylic acid-modified polyethylene is used in the form of an aqueous emulsion.

In order to permit the fine control of the adhesive properties (adhesive force, tack strength, cohesive force and the like) upon various articles upon which the tack sheets are stuck, it is preferred to use carboxylic acid-modified polyethylene together with other polymer materials. Examples of the other polymer materials include emulsions of the above-mentioned conventional and known polymer materials, but particularly preferably examples include vinyl acetate copolymers for example vinyl acetate-ethylene copolymer) and acrylic copolymers for example styrene-alkyl acrylate ester copolymers). Above all, by combining 50 to 99 parts by weight of the former vinyl acetate-ethylene copolymer with 50 to 1 parts by weight of carboxylic acid-modified polyethylene, an excellent thermal delayed tack composition can be obtained in which the tackiness thereof can be remarkably developed by means of heating and which exhibits sufficient tackiness with respect articles.

As the tackifier of component (b), conventionally known tackifiers can be used, but preferable examples thereof include terpene resins and rosins having softening points (JISK 5903) of 70° to 145° C. Examples of the rosins include synthetic rosins, for example, rosin abietate, its hydrogenated compounds, their maleic acid adducts and metallic salts as for example well as their esters with alcohols such as glycerin, pentaerythritol, ethylene glycol and diethylene glycol. Furthermore, examples of the terpene resins include homopolymers and copolymers of α-pinene, β-pinene, dipentene and the like, terpene-phenol copolymers, and their hydrogenated compounds. They are available in the form of aqueous emulsions.

As the solid plasticizer of component (c), there can be used the above-mentioned plasticizers, which are solid at ordinary temperatures, such as for example diphenyl phthalate, dihexyl phthatlate, dicyclohexyl phthalate, dihydroabietyl phthalate, dimethyl isophthalate, sucrose benzoate, ethylene glycol dibenzoate, trimethylolethane tribenzoate, glyceride tribenzoate, pentaerythritol tetrabenzoate, sucrose ocataacetate, tricyclohexyl citrate and N-cyclohexyl-p-toluenesulfonamide.

With regard to a preferable composition ratio of (a) the polymer resin, (b) the tackifier and (c) the solid plasticizer, the tackifier comprises 10 to 120 parts by weight and the solid plasticizer comprises 50 to 300 parts by weight based upon 100 parts by weight of the polymer resin, and the objects of the present invention can be achieved by means of carboxylic acid-modified polyethylene in an amount of 1% by weight or more of the polymer resin of the component (a). If the tackifier is less than 10 parts by weight, tack strength and adhesive force after the thermal activation has been initiated will be low, and if the tackifier is more than 120 parts by weight, a blocking or sticking phenomenon will often occur, when the tack sheets made thereby are wound into a roll. If the solid plasticizer is less than 50 parts by weights, the tack property will be difficult to develop by means of the thermal activation, and if it is in excess of 300 parts by weight, the cohesive force of the tack composition after the thermal activation has been initiated will deteriorate, and therefore the service life after initiation of the thermal activation will also be short. Therefore, such conditions are not practical.

The thermal delayed tack composition comprising the aqueous resin dispersion of the present invention may be prepared by feeding a mixture of (a) the polymer resin, (b) the tackifier and (c) the solid plasticizer to a multi-blade screw extruder, melting and kneading the mixture, feeding a protective colloid thereinto through a means of feed opening disposed upon the extruder, and mixing the components together.

Alternatively, each emulsion of the components (a), (b) and (c) may be prepared singly, and then the respective emulsions may be mixed together.

The concentration of the solid within the aqueous resin dispersion is within the range of 25 to 60% by weight, and the dispersion may be diluted with water, if necessary.

Furthermore, the particle size of the solid within the aqueous resin dispersion is within the range from 0.05 to 3 μm, and is preferably within the range from 0.05 to 1 μm.

By coating the basic sheets with this aqueous resin dispersion containing the components (a), (b) and (c), and then drying them, the thermal delayed tack sheets may be prepared.

Within the aqueous coating system of the present invention, a roll coater, an air-knife coater, a blade coater and a gravure coater, which are usually used, can be utilized, and the coating amount of the aqueous resin dispersion is preferably within the range of 5 to 30 g/m$^2$ with respect to the dried solid.

Examples of the basic sheets used in accordance with the present invention include pulp, paper, polyethylene terephthalate film, polypropylene film, polyvinylidene chloride film, art paper and synthetic paper (Japanese Patent Publication No. 46-40794 and Japanese Patent Unexamined Publication No. 56-141339).

The thermal delayed tack sheets are useful as labels for, for example, bottles of carbonated drinks and shampoos, cans of motor oils, and polyethylene packages of tissue paper.

As discussed above, by aqueously coating the basic sheets with the coating liquid, that is, the thermal delayed tack composition prepared in the form of the aqueous dispersion fundamentally comprising (a) the polymer material containing the carboxylic acid-modified polyethylene, (b) the tackifier and (c) the solid plasticizer, and by drying the same accordingly, the thermal delayed tack sheets can be obtained in which no blocking or sticking phenomenon occurs, even when wound into a roll or superimposed upon each other immediately after the coating thereof, and in which good tack strength and adhesive force are retained even with respect to plastic materials having low polarity.

EXAMPLES

Now, the present invention will be described in detail with reference being made to the following examples but the present invention should not be considered to be limited by these examples. In the examples, "part" means "part by weight of the solid", unless otherwise specified.

EXAMPLE 1

(a) Polymer material:

Emulsion of vinyl acetate-ethylene copolymer (content of vinyl acetate=70% by weight): 70 parts.

Emulsion in which ethylene-acrylic acid copolymer mainly comprising ethylene was mechanically emulsified (trade name Aquatex AC-1000; made by Mitsubishi Petrochemical Co., Ltd.): 30 parts.

(b) Tackifier:

Emulsion of rosin ester (softening point=100° C.): 50 parts.

(c) Solid plasticizer:

Aqueous dispersion of dicyclohexyl phthalate: 100 parts.

These components were blended with one another so as to prepare an aqueous coating solution (concentration of the solid=50%), and either surface of an art paper (having a basis weight of 80 g/m$^2$) was coated with the thus prepared aqueous coating solution so that the amount of the dried coating layer might be 15 g/m$^2$. Afterward, the coated art paper was dried at 50° C. for 2 minutes in order to obtain a non-adhesive coated paper.

COMPARATIVE EXAMPLE 1

The same procedure as set forth in Example 1 was repeated with the exception that all of the polymer resin of component (a) was the emulsion (that is, 100 parts) of vinyl acetate-ethylene copolymer, so that non-adhesive coated paper was obtained.

EXAMPLE 2

(a) Emulsion of styrene-acrylic acid ester copolymer (trade name Ryka Bond ES-58; made by Chuo Rika Kogyo Co., Ltd.); 60 parts.

Emulsion containing ethylene-acrylic acid copolymer used in Example 1 (trade name Aquatex AC-1000; made by Mitsubishi Petrochemical Co., Ltd.); 40 parts.

(b) Emulsion of polymerized rosin pentaerythritol ester (softening point 124° C.): 30 parts.

(c) Aqueous dicyclohexyl phthalate dispersion: 150 parts.

These components were blended with one another so as to prepare an aqueous coating solution (concentration of the solid=50%), and either surface of an art paper (having a basis weight of 80 g/m$^2$) was coated with the thus prepared aqueous coating solution so that the amount of the dried coating layer might be 20 g/m$^2$. Afterward, the coated art paper was dried at 50° C. for 2 minutes in order to obtain a non-adhesive coated paper.

COMPARATIVE EXAMPLE 2

The same procedure as in Example 2 was repeated with the exception that all of the the polymer resin of component (a) was an emulsion (that is, 100 parts) of styrene-acrylic acid ester copolymer, so that a non-adhesive coated paper was obtained.

EXAMPLE 3

The coated paper pieces obtained in Example 1 and Comparative Example 1 were activated by heating the same at 120° C. for 30 seconds and were then stuck upon a bottle made from polypropylene. Afterward, the paper pieces were allowed to stand at room temperature for 2 months, and they were peeled from the bottle by means of one's finger nail. According to this test, the paper piece prepared in Example 1 was strongly stuck upon the bottle, and when it was forcefully peeled from the bottle, its basic paper was broken (basic paper breakage).

On the contrary, the paper piece prepared in Comparative Example 1 was easily peeled from the surface of the bottle article (surface breakage).

EXAMPLE 4

The coated paper pieces obtained in accordance with Example 2 and Comparative Example 2 were activated in the same manner as in Example 3 and were then stuck upon a polyethylene terephthalate film. After 2 months, the same peel test as noted in Example 3 was performed. The paper piece achieved in accordance with Example 2 result in basic paper breakage, but the piece achieved in accordance with Comparative Example 2 was easily peeled from the surface of the article. That is, such resulted in surface breakage.

EXAMPLE 5

(a) Emulsion of vinyl acetate-ethylene copolymer (content of vinyl acetate=70% by weight): 80 parts.

Emulsion in which ethylene-acrylic acid copolymer mainly comprising ethylene was mechanically emulsified (trade name Aquatex AC-2000; made by Mitsubishi Petrochemical Co., Ltd.): 20 parts.

(b) Emulsion of rosin ester (softening point 100° C.): 50 parts.

(c) Aqueous dispersion of dicyclohexyl phthalate: 150 parts.

These components were blended with one another so as to prepare an aqueous coating solution (concentration of the solid=54%), and either surface of an art paper (having a basis weight of 80 g/m²) was coated with the thus prepared aqueous coating solution so that the amount of the dried coating layer might be 14 g/m². Afterward, the coated art paper was dried at 50° C. for 2 minutes, thereby obtaining a non-adhesive coated paper.

This paper piece was then heated at 120° C. for 20 seconds in order to activate it, and immediately the degree of tackiness was measured in accordance with an inclined ball tack measurement method (temperature=20° C., inclination angle=30°), so that a good result of Ball No. 7 was obtained. The sample paper piece was stuck upon a poyethylene film used for packing and was then allowed to stand at room temperature for 3 months. At this time, good adhesion of the sample was maintained.

On the other hand, the sample paper piece of Comparative Example 1, in which 100 parts of vinyl acetate-ethylene copolymer alone were used, was stuck upon the same polyethylene film immediately after the thermal activation thereof, but after 3 months, it was peeled off therefrom with ease.

Obviously, many modifications and variations of the present invention are possible in light of the above teachings. It is therefore to be understood that within the scope of the appended claims, the present invention may be practiced otherwise than as specifically described herein.

What is claimed is:

1. Thermal delayed-tack adhesive compositions which comprise an aqueous resin dispersion, comprising in terms of parts by weights of solid:
   (a) 100 parts by weight of a polymer resin;
   (b) 10 to 120 parts by weight of a tackifier; and
   (c) 50 to 300 parts by weight of a plasticizer which is solid at room temperature but which upon being heated and melted as a result of thermal activation, said plasticizer swells and dissolves said polymer resin and crystallizes slowly such that even after termination of said thermal activation, a tack state is sustained and retained for a substantial period of time;
   wherein said polymer resin comprises a blend of a resin and at least 20% by weight of carboxylic acid-modified polyethylene,
   whereby enhanced tack strength and adhesive force with respect to plastic materials exhibiting low polarity, and relative to compositions which do not contain said carboxylic acid-modified polyethylene, is able to be achieved.

2. Thermal delayed-tack adhesive compositions according to claim 1 wherein said carboxylic acid-modified polyethlene is at least one selected from ethylene-acrylic acid copolymer and ethylene-methacrylic acid copolymer.

3. Thermal delayed-tack adhesive compositions according to claim 1, wherein:
   said polymer resin comprises from 20 to 50% by weight of carboxylic acid-modified polyethylene and one or more resins selected from the group consisting of polyvinyl acetate, polybutyl methacrylate, vinyl chloride-vinylidene chloride copolymer, synthetic rubbers, vinyl acetate-2-ethylhexyl acrylate copolymer, vinyl acetate-ethylene copolymer, vinylpyrrolidone-styrene copolymer, styrene-acrylic acid ester copolymer, styrene-butadiene copolymer, vinyl-pyrrolidone-ethyl acrylate copolymer, and metallic salts of styrene-maleic anhydride copolymer.

4. A thermal delayed tack composition according to claim 1 wherein said polymer resin has a melting point of 130° C. or less.

5. A thermal delayed tack composition according to claim 1 wherein said polymer resin is a combination of 50 to 80% by weight of vinyl acetate-ethylene copolymer and 50 to 20% by weight of carboxylic acid-modified polyethylene.

6. A thermal delayed tack composition according to claim 1 wherein said solid plasticizer is at least one selected from the group consisting of diphenyl phthalate, dihexyl phthalate, dicyclohexyl phthalate, dihydroabietyl phthalate, dimethyl isophthalate, sucrose benzoate, ethylene glycol dibenzoate, trimethylolethane tribenzoate, glyceride tribenzoate, pentaerythritol tetrabenzoate, sucrose octaacetate, tricyclohexyl citrate and N-cyclohexyl-p-toluenesulfonamide.

7. A thermal delayed tack composition according to claim 1 wherein the concentration of the solid in said aqueous resin dispersion is in the range of 25 to 60% by weight.

8. A thermal delayed tack composition according to claim 1 wherein the particle size of the solid in said aqueous resin dispersion is from 0.05 to 3 μm.

9. Thermal delayed-tack adhesive sheets prepared by aqueously coating basic sheets with a thermal delayed-tack adhesive composition which comprises an aqueous resin dispersion, comprising in terms of parts by weight of solid:
   (a) 100 parts by weight of a polymer resin;
   (b) 10 to 120 parts by weight of a tackifier; and
   (c) 50 to 300 parts by weight of a plasticizer which is solid at room temperature but which upon being heated and melted as a result of thermal activation, said plasticizer swells and dissolves said polymer resin and crystallizes slowly such that even after termination of said thermal activation, a tack state is sustained and retained for a substantial period of time;
   wherein said polymer resin comprises a blend of a resin and at least 20% by weight of carboxylic acid-modified polyethylene,
   whereby enhanced tack strength and adhesive force with respect to plastic materials exhibiting low polarity, and relative to compositions which do not contain said carboxylic acid-modified polyethylene, is able to be achieved.

10. Thermal delayed tack sheets according to claim 9 wherein the coating amount of said thermal delayed tack composition is in the range of 5 to 30 g/m² in terms of the dried solid.

11. Thermal delayed tack sheets according to claim 9 wherein the material of said basic sheets is at least one selected from the group consisting of pulpe, paper, polyethylene film, polyethylene terephthalate film, polypropylene film, polyvinylidene chloride film, art paper and synthetic paper.

12. A thermal delayed tack composition according to claim 1, wherein:
   said tackifier is at least one selected from the group comprising rosins, rosin abietate, rosin hydrides, maleic acid adducts of rosins, metallic salts of rosins, rosin esters, α-pinene homopolymers, β-pinene homopolymers, dipentene homopolymers, copolymers of two or more selected from the group comprising α-pinene, β-pinene and dipentene, terpenephenol copolymers, hydrogenated compounds of α-pinene homopolymers, hydrogenated compounds of β-pinene homopolymers, hydrogenated compounds of dipentene homopolymers, hydrogenated compounds of copolymers of two or more selected from the group comprising α-pinene, β-pinene, and dipentene, and hydrogenated compounds of terpene-phenol copolymers.

13. A thermal delayed-tack adhesive composition which comprises an aqueous resin dispersion, comprising in terms of parts by weight of solid:
   (a) 100 parts by weight of a polymer resin;
   (b) 10 to 120 parts by weight of a tackifier; and
   (c) 50 to 300 parts by weight of a plasticizer which is solid at room temperature but which upon being heated and melted as a result of thermal activation, said plasticizer swells and dissolves said polymer resin and crystallizes slowly such that even after termination of said thermal activation, a tack state is sustained and retained for a substantial period of time;
   wherein said polymer resin comprises a blend of a resin, selected from the group consisting of polyvinyl acetate, polybutyl methacrylate, vinyl chloride-vinylidene chloride copolymer, synthetic rubbers, vinyl acetate-2-ethylhexyl acrylate copolymer, vinyl acetate-ethylene copolymer, vinylpyrrolidone-styrene copolymer, styrene-acrylic acid ester copolymer, styrene-butadiene copolymer, vinyl-pyrrolidone-ethyl acrylate copolymer, and metallic salts of styrene-maleic anhydride copolymer; and at least 20% by weight of carboxylic acid-modified polyethylene,
   whereby enhanced tack strength and adhesive force, for a period of at least two months, with respect to plastic materials exhibiting low polarity, and relative to compositions which do not contain said carboxylic acid-modified polyethylene, is able to be achieved.

14. A composition as set forth in claim 13, wherein:
said carboxylic acid-modified polyethylene is at least one selected from ethylene-acrylic acid copolymer and ethylene-methacrylic acid copolymer.

15. A composition as set forth in claim 13, wherein:
said polymer resin has a melting point of 130° C. or less.

16. A composition as set forth in claim 13, wherein:
said polymer resin is a combination of 50-80% by weight of vinyl acetate-ethylene copolymer and 50-20% by weight of carboxylic acid-modified polyethylene.

17. A thermal delayed-tack adhesive sheet prepared by aqueously coating a basic sheet with a thermal delayed-tack adhesive composition which comprises an aqueous resin dispersion, comprising in terms of parts by weight of solid:
   (a) 100 parts by weight of a polymer resin;
   (b) 10 to 120 parts by weight of a tackifier; and
   (c) 50 to 300 parts by weight of a plasticizer which is solid at room temperature bu which upon being heated and melted as a result of thermal activation, said plasticizer swells and dissolves said polymer resin and crystallizes slowly such that even after termination of said thermal activation, a tack state is sustained and retained for a substantial period of time;
   wherein said polymer resin comprises a blend of a resin, selected from the group consisting of polyvinyl acetate, polybutyl methacrylate, vinyl chloride-vinylidene chloride copolymer, synthetic rubbers, vinyl acetate-2-ethylhexyl acrylate copolymer, vinyl acetate-ethylene copolymer, vinylpyrrolidone-styrene copolymer, styrene-acrylic acid ester copolymer, styrene-butadiene copolymer, vinyl-pyrrolidone-ethyl acrylate copolymer, and metallic salts of styrene-maleic anhydride copolymer; and at least 20% by weight of carboxylic acid-modified polyethylene,
   whereby enhanced tack strength and adhesive force, for a period of at least two months, with respect to plastic materials exhibiting low polarity, and relative to compositions which do not contain said carboxylic acid-modified polyethylene, is able to be achieved.

18. A sheet as set forth in claim 17, wherein:
said carboxylic acid-modified polyethylene is at least one selected from ethylene-acrylic acid copolymer and ethylene-methacrylic acid copolymer.

19. A sheet as set forth in claim 17, wherein:
said polymer resin has a melting point of 130° C. or less.

20. A sheet as set forth in claim 17, wherein:
said polymer resin is a combination of 50-80% by weight of vinyl acetate-ethylene copolymer and 50-20% by weight of carboxylic acid-modified polyethylene.

* * * * *